(12) United States Patent
Kawasaki et al.

(10) Patent No.: US 12,477,434 B2
(45) Date of Patent: Nov. 18, 2025

(54) WIRELESS COMMUNICATION APPARATUS, INFORMATION PROCESSING APPARATUS AND INFORMATION PROCESSING METHOD

(71) Applicants: TOYOTA JIDOSHA KABUSHIKI KAISHA, Toyota (JP); DENSO TEN Limited, Hyogo (JP)

(72) Inventors: Hiroki Kawasaki, Toyota (JP); Noriaki Ito, Toyota (JP); Hiroto Nakagawa, Nagoya (JP); Satoru Ikeda, Hyogo (JP)

(73) Assignees: TOYOTA JIDOSHA KABUSHIKI KAISHA, Toyota (JP); DENSO TEN Limited, Kobe (JP)

( * ) Notice: Subject to any disclaimer, the term of this patent is extended or adjusted under 35 U.S.C. 154(b) by 583 days.

(21) Appl. No.: 17/944,515

(22) Filed: Sep. 14, 2022

(65) Prior Publication Data
US 2023/0088173 A1    Mar. 23, 2023

(30) Foreign Application Priority Data
Sep. 21, 2021    (JP) .................................. 2021-153663

(51) Int. Cl.
*H04W 36/00*    (2009.01)
*H04W 36/32*    (2009.01)
*H04W 36/14*    (2009.01)

(52) U.S. Cl.
CPC ...... *H04W 36/322* (2023.05); *H04W 36/1446* (2023.05)

(58) Field of Classification Search
CPC ...................... H04W 36/322; H04W 36/1446; H04W 84/12

USPC .......................................................... 455/436
See application file for complete search history.

(56) References Cited

U.S. PATENT DOCUMENTS

| | | | |
|---|---|---|---|
| 7,712,670 B2 * | 5/2010 | Sauerwein, Jr. ...... | G06Q 10/083 235/383 |
| 7,949,335 B2 * | 5/2011 | Stefani .................. | H04W 92/02 455/431 |
| 7,962,152 B2 * | 6/2011 | Buerger ................ | H04W 4/029 455/456.3 |
| 7,970,419 B2 * | 6/2011 | Oh .......................... | G01S 19/05 455/457 |
| 8,000,719 B1 * | 8/2011 | Lambert ................ | H04W 64/00 455/456.2 |
| 8,005,058 B2 * | 8/2011 | Pecen ........... | H04W 36/008375 455/425 |

(Continued)

FOREIGN PATENT DOCUMENTS

| | | |
|---|---|---|
| CN | 101116119 A | 1/2008 |
| JP | 2009-275427 A | 11/2009 |

(Continued)

*Primary Examiner* — Amancio Gonzalez
(74) *Attorney, Agent, or Firm* — Sughrue Mion, PLLC (57) ABSTRACT

A wireless communication apparatus including a first communication module configured to use a first communication network that is a cellular communication network and a second communication module configured to use a second communication network that is a communication network other than the cellular communication network, determines which of the first communication network and the second communication network is to be used to perform communication, based on a sign of departure of a vehicle.

16 Claims, 10 Drawing Sheets

(56) References Cited

U.S. PATENT DOCUMENTS

| | | | | |
|---|---|---|---|---|
| 8,280,409 B2* | 10/2012 | Alberth, Jr. | G06Q 10/109 | 455/414.3 |
| 8,400,261 B2* | 3/2013 | Lambert | H04M 1/6091 | 340/439 |
| 8,493,906 B1* | 7/2013 | Troxel | H04B 7/18506 | 370/316 |
| 8,831,601 B2* | 9/2014 | Mitchell | H04B 7/18506 | 455/431 |
| 8,897,786 B2* | 11/2014 | Ryu | A61M 39/22 | 455/437 |
| 8,912,924 B2* | 12/2014 | Scofield | G07B 15/04 | 340/988 |
| 8,995,993 B2* | 3/2015 | Lauer | H04L 49/15 | 455/431 |
| 9,020,121 B1* | 4/2015 | Dhanda | H04M 7/0036 | 379/266.04 |
| 9,021,049 B2* | 4/2015 | Bai | H04L 67/566 | 709/200 |
| 9,182,750 B2* | 11/2015 | Rawls-Meehan | A47C 31/008 | |
| 9,253,200 B2* | 2/2016 | Schwarz | H04L 67/12 | |
| 9,414,303 B1* | 8/2016 | Linden | H04W 84/18 | |
| 9,474,097 B2* | 10/2016 | Seo | H04W 76/18 | |
| 9,501,931 B1* | 11/2016 | Lui | B60R 25/24 | |
| 9,577,692 B2* | 2/2017 | Lee | H04W 8/205 | |
| 9,693,297 B2* | 6/2017 | Condeixa | H04L 1/08 | |
| 9,699,732 B2* | 7/2017 | Kim | H04W 76/28 | |
| 9,942,754 B2* | 4/2018 | Fokkelman | H04L 63/0471 | |
| 10,131,320 B2* | 11/2018 | Schmotzer | B60R 25/1001 | |
| 10,251,100 B2* | 4/2019 | Masini | H04W 36/0027 | |
| 10,272,793 B2* | 4/2019 | Perry | G01C 21/3469 | |
| 10,298,726 B2* | 5/2019 | Müeller | H04L 69/40 | |
| 10,325,423 B1* | 6/2019 | Mannan | G07C 5/008 | |
| 10,331,121 B2* | 6/2019 | Cooper | H04W 76/11 | |
| 10,362,913 B2* | 7/2019 | Gatter | A47L 7/0004 | |
| 10,500,981 B1* | 12/2019 | Mahmoud | G08B 21/0225 | |
| 10,506,618 B2* | 12/2019 | Murphy | H04W 36/0011 | |
| 10,533,549 B1* | 1/2020 | Bush | F04B 49/065 | |
| 10,536,886 B2* | 1/2020 | Cai | H04W 36/035 | |
| 10,608,941 B2* | 3/2020 | Buczek | H04L 69/18 | |
| 10,652,428 B2* | 5/2020 | Sakayama | H04N 1/33323 | |
| 10,834,572 B2* | 11/2020 | Chughtai | H04W 12/42 | |
| 10,868,733 B2* | 12/2020 | Dribinski | H04W 64/006 | |
| 11,055,111 B2* | 7/2021 | Zhu | G06F 9/44505 | |
| 11,062,237 B2* | 7/2021 | Singh | G01C 21/3438 | |
| 11,134,435 B2* | 9/2021 | Choi | H04W 48/18 | |
| 11,243,530 B2* | 2/2022 | Jiwani | G01C 21/3438 | |
| 11,260,816 B1* | 3/2022 | Bodenhamer | B60R 21/01556 | |
| 11,274,016 B2* | 3/2022 | Pahlke | B66B 5/02 | |
| 11,392,117 B2* | 7/2022 | Pal | H04L 63/08 | |
| 11,429,094 B2* | 8/2022 | Zhang | G05D 1/0022 | |
| 11,456,815 B2* | 9/2022 | Brown | H04J 14/0227 | |
| 11,464,076 B2* | 10/2022 | Kim | H04W 24/10 | |
| 11,653,292 B2* | 5/2023 | Azizi | H04B 17/3913 | 370/329 |
| 11,658,879 B2* | 5/2023 | Buyukkoc | H04W 52/223 | 370/254 |
| 11,726,184 B2* | 8/2023 | Ferreira | G01S 17/894 | 356/4.01 |
| 11,830,369 B2* | 11/2023 | Lindqvist | G08G 5/32 | |
| 11,843,446 B2* | 12/2023 | Hong | H04W 48/16 | |
| 11,917,400 B2* | 2/2024 | Alexander | H04W 8/205 | |
| 12,195,054 B2* | 1/2025 | Cooper | B60T 7/18 | |
| 12,262,310 B2* | 3/2025 | Aoyagi | H04W 76/10 | |
| 2006/0099959 A1 | 5/2006 | Staton et al. | | |
| 2007/0093200 A1* | 4/2007 | Dobosz | H04B 7/18565 | 455/3.02 |
| 2008/0182573 A1* | 7/2008 | Lauer | H04W 84/005 | 455/431 |
| 2009/0287415 A1* | 11/2009 | Buerger | G01C 21/005 | 701/300 |
| 2011/0039525 A1* | 2/2011 | Doyle | H04W 68/00 | 455/414.1 |
| 2012/0290529 A1* | 11/2012 | Baleedpalli | G06F 16/23 | 707/E17.005 |
| 2014/0005847 A1* | 1/2014 | Melen | G06Q 10/047 | 700/291 |
| 2014/0213246 A1* | 7/2014 | Saito | H04W 8/02 | 455/432.1 |
| 2015/0153440 A1* | 6/2015 | Amizur | G01S 13/765 | 455/456.1 |
| 2016/0094425 A1* | 3/2016 | Schulz | H04L 41/0816 | 709/224 |
| 2016/0309485 A1* | 10/2016 | Yoon | H04W 76/15 | |
| 2016/0337322 A1* | 11/2016 | Kang | H04L 67/12 | |
| 2016/0344792 A1* | 11/2016 | Sinivaara | H04N 21/25841 | |
| 2017/0041978 A1* | 2/2017 | Radhakrishnan | H04W 16/26 | |
| 2017/0272995 A1* | 9/2017 | Kim | H04W 48/18 | |
| 2018/0103070 A1* | 4/2018 | Cavgalar | H04L 65/1073 | |
| 2018/0114420 A1* | 4/2018 | Siminoff | G08B 13/19606 | |
| 2018/0246508 A1* | 8/2018 | Choi | G07C 9/00 | |
| 2018/0262886 A1 | 9/2018 | Hayakawa | | |
| 2019/0272483 A1* | 9/2019 | Hiray | H04W 4/40 | |
| 2019/0278262 A1* | 9/2019 | Taylor | G05D 1/0016 | |
| 2019/0389477 A1 | 12/2019 | Balakrishna et al. | | |
| 2020/0168086 A1* | 5/2020 | Rakshit | H04W 4/44 | |
| 2021/0125196 A1* | 4/2021 | Sugimoto | G06Q 30/02 | |
| 2021/0282064 A1* | 9/2021 | Wang | H04W 36/00224 | |
| 2022/0274588 A1* | 9/2022 | Marek | B62D 15/0285 | |
| 2022/0358247 A1* | 11/2022 | Max | G06F 21/6254 | |
| 2023/0156458 A1* | 5/2023 | Hong | H04W 76/15 | 370/329 |
| 2023/0199893 A1* | 6/2023 | Chen | H04W 76/25 | 370/328 |
| 2023/0244470 A1* | 8/2023 | Shimon | H04L 67/12 | 717/172 |
| 2023/0246683 A1* | 8/2023 | Li | H04B 7/088 | 375/262 |
| 2023/0413357 A1* | 12/2023 | Ma | H04W 72/21 | |
| 2024/0244413 A1* | 7/2024 | Wellens | H04L 67/12 | |

FOREIGN PATENT DOCUMENTS

| | | |
|---|---|---|
| JP | 2020-29860 A | 2/2020 |
| WO | 2017/047351 A1 | 3/2017 |

* cited by examiner

CASE WHERE VEHICLE IN PARKING LOT AT HOME

CONNECTED TO HOME NETWORK

FIG. 2B

CASE WHERE VEHICLE DEPARTED FROM PARKING LOT AT HOME

ATTEMPT TO CONNECT TO HOME NETWORK AFTER TIME-OUT. MAKE SWITCHING TO CELLULAR COMMUNICATION NETWORK

FIG. 2C

EMBODIMENT ACCORDING TO PRESENT DISCLOSURE

DISCONNECTION

DETECT THAT DRIVER APPROACHED AND MAKE SWITCHING TO CELLULAR COMMUNICATION NETWORK

CONTINUOUS COMMUNICATION IS POSSIBLE EVEN AFTER DEPARTURE

WIRELESS COMMUNICATION APPARATUS, INFORMATION PROCESSING APPARATUS AND INFORMATION PROCESSING METHOD

CROSS REFERENCE TO THE RELATED APPLICATION

This application claims the benefit of Japanese Patent Application No. 2021-153663, filed on Sep. 21, 2021, which is hereby incorporated by reference herein in its entirety.

BACKGROUND

Technical Field

The present invention relates to mobile communication.

Description of the Related Art

Techniques that control an electronic lock of an automobile via a mobile terminal have been known. For example, Patent Literature 1 discloses a system that locks/unlocks an automobile using a mobile phone with an electronic key function.

CITATION LIST

Patent Literature

Patent Literature 1: Japanese Patent Laid-Open No. 2009-275427

SUMMARY

An object of the present disclosure is to provide a wireless communication system with enhanced availability of communication.

A wireless communication apparatus according to a first aspect of the present disclosure is a wireless communication apparatus mounted on a vehicle, the wireless communication apparatus including: a first communication module configured to use a first communication network that is a cellular communication network; a second communication module configured to use a second communication network that is a communication network other than the cellular communication network; and a controller configured to determine which of the first communication network and the second communication network is to be used to perform communication, based on a sign of departure of the vehicle.

An information processing apparatus according to a second aspect of the present disclosure is an information processing apparatus for performing communication control of a vehicle capable of using a first communication network that is a cellular communication network and a second communication network that is a communication network other than the cellular communication network, the information processing apparatus including a controller configured to determines which of the first communication network and the second communication network is to be used for the vehicle to perform communication, based on a sign of departure of the vehicle.

An information processing method according to a third aspect of the present disclosure is an information processing method executed by an information processing apparatus, the information processing method including: detecting a sign of departure of a vehicle capable of using a first communication network that is a cellular communication network and a second communication network that is a communication network other than the cellular communication network; and determining which of the first communication network and the second communication network is to be used for the vehicle to perform communication, based on the sign of departure of the vehicle.

Also, another aspect of the present disclosure provides a program for making a computer execute the above information processing method or a computer-readable storage medium that non-transitorily stores the program.

The present disclosure enables provision of a wireless communication system with enhanced availability of communication.

DESCRIPTION OF THE EMBODIMENTS

In recent years, automobiles connectable to a network have been popularized. Provision of network connection by an apparatus mounted on a vehicle enables provision of a service of providing a support for a driver in case of an emergency and a service relating to security. Such apparatus is also called a data communication module (DCM). A DCM can perform communication using communication standards for cellular communication and a wireless LAN.

Depending on the communication standard the DCM uses, there is the problem of interruption of communication during the vehicle travelling. For example, a case where a vehicle is connected to an access point of a public wireless LAN during stoppage of the vehicle will be considered. Since the wireless LAN is not a mobile communication, communication is discontinued when the vehicle starts moving. However, after departure of the vehicle, if switching to a cellular channel is not smoothly made, communication may temporarily become impossible.

A wireless communication apparatus according to the present disclosure solves such problem.

A wireless communication apparatus according to an aspect of the present disclosure is a wireless communication apparatus mounted on a vehicle, the wireless communication apparatus including: a first communication module configured to use a first communication network that is a cellular communication network; a second communication module configured to use a second communication network that is a communication network other than the cellular communication network; and a controller configured to determine which of the first communication network and the second communication network is to be used to perform communication, based on a sign of departure of the vehicle.

The wireless communication apparatus according to the present disclosure is typically an apparatus mounted on a vehicle.

The wireless communication apparatus includes a first communication module and a second communication module. The first communication module is a communication module that uses a cellular communication network (mobile communication network) and the second communication module is a communication module that uses a wireless communication network other than the cellular communication network. The second communication module is connected to, e.g., a public wireless LAN network, a road-to-vehicle communication network or a vehicle-to-vehicle communication network according to a communication standard, for example, IEEE802.11, DSRC or millimeter-wave communications.

Use of a cellular communication network enables performing stable communication even during travelling. On the other hand, use of a cellular communication network involves a cost, and thus, during stoppage of a vehicle, a network, such as a wireless LAN, that is available free of charge (second communication network) is often used.

However, since the second communication network is not a mobile communication network, when the vehicle starts travelling, communication may become impossible. It is possible to detect that communication has become impossible and make switching to a cellular communication network; however, a period of time in which communication is impossible may occurs because of a time lag.

Therefore, in the present disclosure, the controller determines whether to perform communication via a first communication network or perform communication via a second communication network, based on a sign of departure of the vehicle.

The sign of departure of the vehicle may be determined based on, for example, a start-up status of a driving system or may be determined based on a result of detection of an occupant. For example, it is possible to determine that there is a sign of departure in the vehicle when an ignition of the vehicle is turned on. Also, it is possible to determine that there is a sign of departure in the vehicle when it is determined that an occupant has got in the vehicle. Furthermore, it is possible to determine that the occupant has come close to the vehicle (that is, there is a sign of departure in the vehicle) when a mobile terminal carried by the occupant is newly detected.

Such configuration as above enables proper switching of communication channels before a vehicle starts travelling and thus enables preventing interruption of communication.

Specific embodiments of the present disclosure will be described below with reference to the drawings. Hardware configurations, module configurations and functional configurations and the like described in each of the embodiments are not intended to limit the technical scope of the disclosure thereto unless specifically noted otherwise.

First Embodiment

Figure 1:
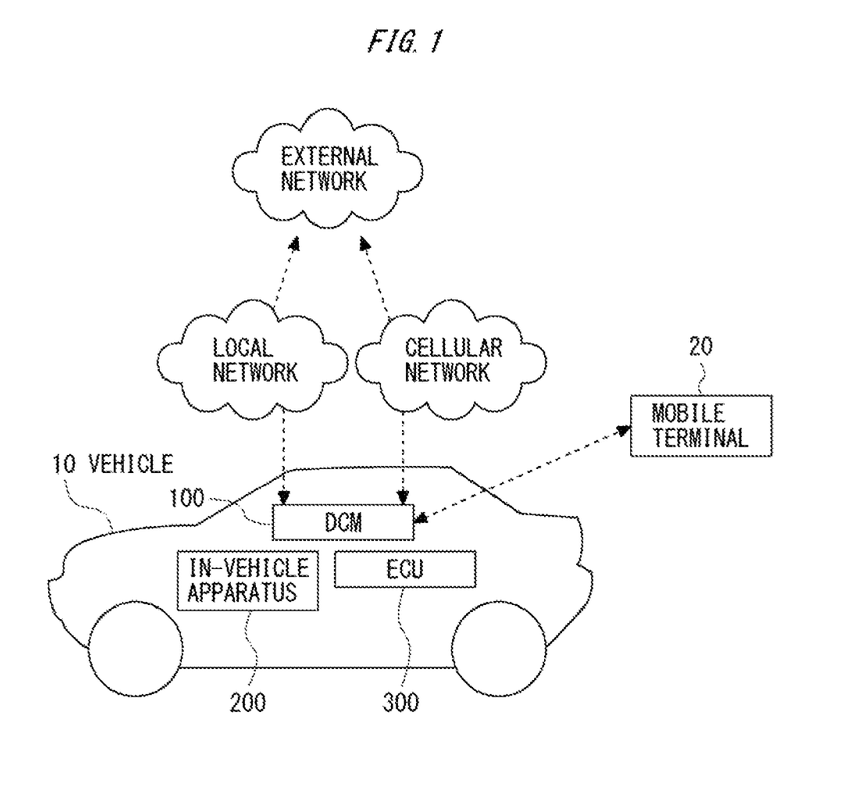
FIG. 1 is a schematic diagram of a vehicle system according to a first embodiment.

An overview of a vehicle system according to a first embodiment will be described with reference to FIG. 1. The vehicle system according to the present embodiment includes a vehicle 10 and a mobile terminal 20.

The vehicle 10 is a connected car having a function that communicates with an external network. The vehicle 10 includes a DCM (data communication module) 100, an in-vehicle apparatus 200 and an electronic control unit 300 (also referred to as ECU). Although FIG. 1 illustrates a single ECU 300 as an example, the vehicle 10 may include a plurality of ECUs 300.

The DCM 100 is an apparatus that performs wireless communication with an external network. The DCM 100 functions as a gateway for connecting a component included in the vehicle 10 (hereinafter, "vehicle component") to an external network. For example, the DCM 100 provides access to an external network, to the in-vehicle apparatus 200 and the ECU 300 included in the vehicle 10. Consequently, the in-vehicle apparatus 200 and the ECU 300 can communicate with an external apparatus connected to the network, via the DCM 100.

The DCM 100 is configured to be capable of performing communication using two communication channels that are a mobile communication network and a local network. The mobile communication network is a communication network using a cellular network (hereinafter, "cellular communication network"). Where a cellular communication network is used, access to an external network is possible even during the vehicle 10 travelling.

The local network is a network that provides a connection service at a predetermined access point, such as, for example, a home network, a public wireless LAN network or a road-to-vehicle communication network. The vehicle 10 can access an external network only within a range in which wireless communication with the access point is possible. For example, where a home network built at home is used as the local network, the vehicle 10 can perform communication only in a predetermined range with the home as a center. The local network is typically a network incapable of performing a handover.

The mobile terminal 20 is a computer carried by an occupant of the vehicle. The mobile terminal 20 is a small computing device, such as a smartphone, a tablet computer or a wearable computer. In the vehicle system according to the present embodiment, an electronic lock of the vehicle 10 can be locked/unlocked by the mobile terminal 20 performing near-field wireless communication with the DCM 100 for transmission/reception of an electronic key.

Figure 2A:
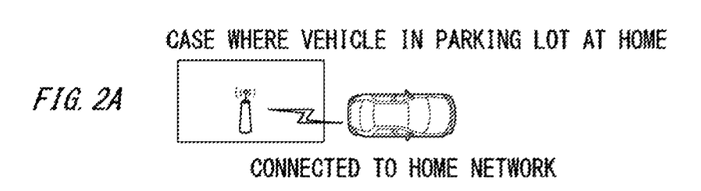
FIGS. 2A to 2C are diagrams each illustrating switching of communication channels.

Next, features of the DCM 100 in the present embodiment will be described with reference to FIGS. 2A to 2C.

In the present example, it is assumed that a home network using a wireless LAN is built at a home of an owner of the vehicle 10. Here, where the vehicle 10 is in a parking lot in the owner's home, the DCM 100 can connect to a network via the home network (FIG. 2A). Consequently, e.g., download of data (typically, music and video, electronic mails, traffic information, road map data, etc.) to be used during travelling and update of software to be executed by the in-vehicle apparatus 200 or the ECU 300 become possible.

Figure 2B:
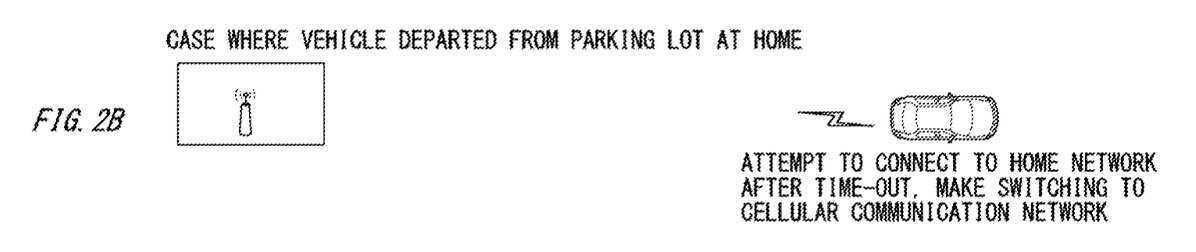

Upon departure of the vehicle 10 in this state, a radio signal from the home network is gradually weaken and thus communication gradually becomes impossible (FIG. 2B). Upon occurrence of communication time-out, the DCM 100 switches the communication channel to a cellular channel; however, during the time until the switching is completed, a duration for which communication is impossible occurs. For example, if the in-vehicle apparatus 200 plays a video or music via streaming in this duration, the play may stop.

Figure 2C:
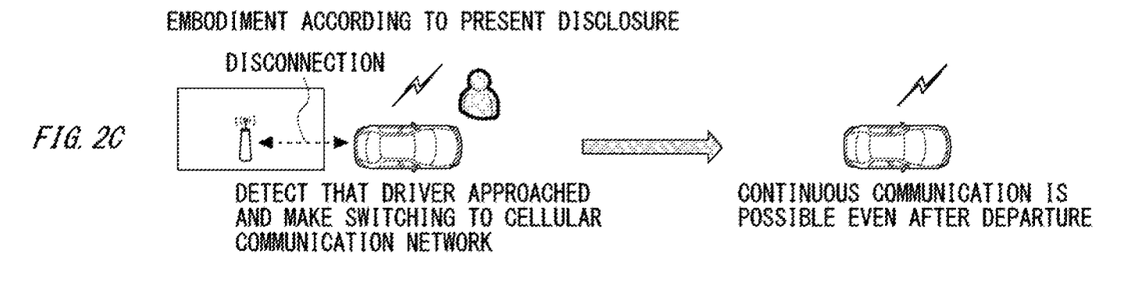

Therefore, the DCM 100 according to the present embodiment detects that a driver has come close to the vehicle 10 (that is, detects a sign of departure of the vehicle 10), and switches the communication channel from the local network to the cellular communication network in advance (FIG. 2C). Consequently, continuation of communication with no interruption after departure of the vehicle 10 becomes possible. A specific method will be described later.

Figure 3:
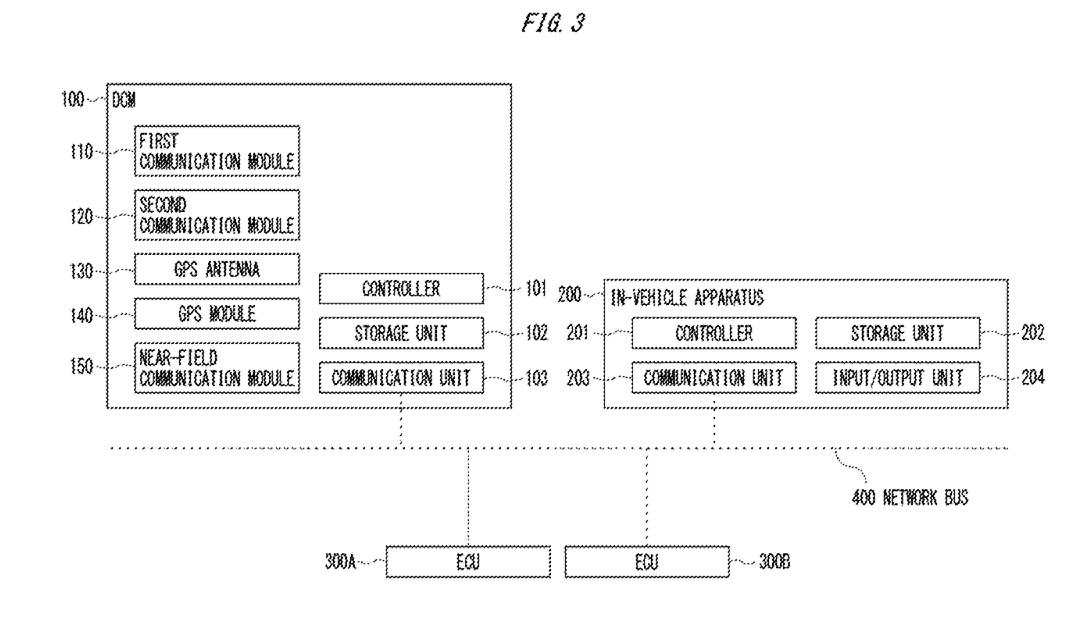
FIG. 3 is a diagram illustrating components included in a vehicle according to the first embodiment.

FIG. 3 is a diagram illustrating components included in the vehicle 10 according to the present embodiment. The vehicle 10 according to the present embodiment includes the DCM 100, the in-vehicle apparatus 200 and a plurality of ECUs 300A, 300B . . . (hereinafter, collectively referred to as "ECUs 300").

The ECUs 300 may include a plurality of ECUs that control different vehicle components. Examples of the plurality of ECUs can include, e.g., a body ECU, an engine ECU, hybrid ECU and a powertrain ECU.

The DCM 100 includes a first communication module 110, a second communication module 120, a GPS antenna 130, a GPS module 140, a near-field communication module 150, a controller 101, a storage unit 102 and a communication unit 103.

The first communication module 110 is a communication module that performs wireless communication based on cellular communications. The first communication module 110 includes an antenna element that inputs a radio signal and that outputs a radio signal. In the present embodiment, the antenna element is one that complies with mobile communication standards (for example, 3G, LTE, 5G, etc.).

The second communication module 120 is a communication module that performs wireless communication based on a communication standard other than the cellular communications. Examples of the communication standard that can be employed by the second communication module 120 can include, e.g., Wi-Fi (registered trademark), DSRC (dedicated short-range communications) and millimeter-wave communications. As with the first communication module, the second communication module 120 includes an antenna element that inputs a radio signal and that outputs a radio signal. Note that the antenna may include a plurality of physical antennae. For example, where communication is performed using high-frequency radio waves such as microwaves or millimeter waves, a plurality of antennae may dispersedly be disposed for stabilization of communication.

The GPS antenna 130 is an antenna that receives a positioning signal transmitted from a positioning satellite (also referred to as "GNSS satellite").

The GPS module 140 is a module that calculates position information based on the signal received by the GPS antenna 130.

The near-field communication module 150 is a module that performs communication with the mobile terminal 20 carried by the user, via direct connection. The near-field communication module 150 performs communication in a close range (to the extent that communication between the inside of the cabin and the outside of the cabin is possible) using a predetermined wireless communication standard.

In the present embodiment, the near-field communication module 150 performs data communication according to Bluetooth (registered trademark) Low Energy standard (hereinafter, "BLE"). BLE is a low power communication standard based on Bluetooth and has features of not requiring pairing between devices and enabling immediately starting communication upon detection of a partner device.

Although in the present embodiment, BLE is described as an example, any of other wireless communication standards can be used. For example, an NFC (near-field communication), UWB (ultra-wideband) or WiFi (registered trademark) may be used.

The controller 101 is an arithmetic unit that implements various functions of the DCM 100 by executing a predetermined program. The controller 101 may be implemented by, for example, a CPU.

The controller 101 executes a function that mediates communication between an external network and a component included in the vehicle 10 (vehicle component). For example, where a certain vehicle component needs communication with an external network, the controller 101 executes a function that relays data transmitted from the vehicle component, to the external network. Also, the controller 101 executes a function that receives data transmitted from an external network and that transfers the data to an appropriate vehicle component.

Furthermore, the controller 101 can execute a function specific to the DCM 100. For example, the controller 101 is configured to be capable of executing a monitoring function and a calling function of a security system, and can perform security notification, emergency notification, etc., based on a trigger that has occurred in the vehicle.

The storage unit 102 is a memory device including a main memory and an auxiliary memory. In the auxiliary memory, e.g., an operating system (OS), various programs and various tables are stored, and functions meeting a predetermined purpose such as those described later can be implemented by loading a program stored in the auxiliary memory onto the main memory and executing the program.

The communication unit 103 is an interface unit for connecting the DCM 100 to an in-vehicle network. In the present embodiment, a plurality of vehicle components including the in-vehicle apparatus 200 and the ECU 300 are mutually connected via a bus 400 of the in-vehicle network. Examples of a standard for the in-vehicle network include CAN (Controller Area Network). Where the in-vehicle network is one using a plurality of standards, the communication unit 103 may include a plurality of interface devices complying with standards for respective communication destinations. Examples of communication standards other than CAN can include, e.g., Ethernet (registered trademark).

The DCM 100 may also be configured to be capable of operating independently from other components included in the vehicle 10. For example, an auxiliary battery may be incorporated in the DCM 100 so that the DCM 100 can operate solely not via an external power supply. Such configuration enables providing, e.g., emergency notification even if an operation failure (for example, power feeding failure) occurs in another component of the vehicle 10 due to, e.g., a traffic accident.

Figure 4:
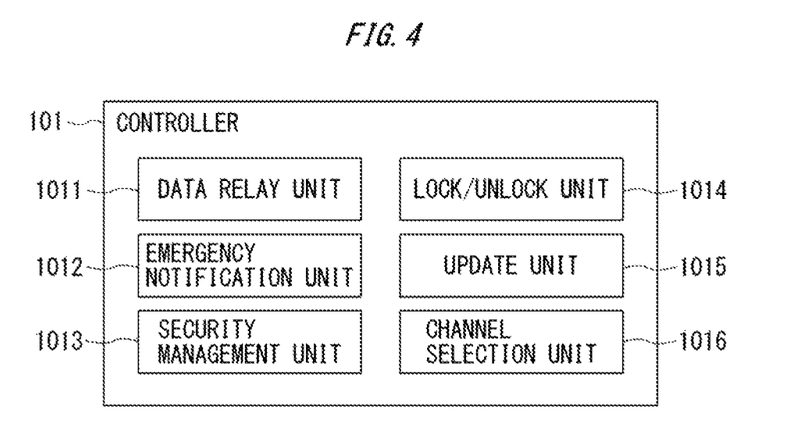
FIG. 4 is a schematic diagram illustrating functional modules included in a controller.

Next, functions implemented by the controller 101 will be described. FIG. 4 is a schematic diagram illustrating functional modules included in the controller 101. The functional modules included in the controller 101 can be implemented by programs stored in storage means such as a ROM being executed by the controller 101.

A data relay unit 1011 relays data transmitted/received to/from vehicle components. For example, the data relay unit 1011 receives a message sent by a first apparatus connected to the in-vehicle network, and, as necessary, performs processing for transferring the message to a second apparatus connected to the in-vehicle network. Each of the first and second apparatuses may be an ECU 300 or another vehicle component.

Also, if the data relay unit 1011 has received a message addressed to an external network from a vehicle component, the data relay unit 1011 relays the message to the external network. Also, the data relay unit 1011 receives data transmitted from an external network and transfers the data to an appropriate vehicle component.

Upon occurrence of an abnormal event in the vehicle 10, the emergency notification unit 1012 provides emergency notification to an operator outside the vehicle. Examples of the abnormal event include a traffic accident and vehicle malfunction. Upon occurrence of a predetermined trigger, for example, depression of a call button provided inside the vehicle or deployment of an airbag, the emergency notification unit 1012 starts connection with the operator, enabling verbal communication between an occupant of the vehicle and the operator. At a time of emergency notification, the emergency notification unit 1012 may transmit position information of the vehicle to the operator. In this case, the emergency notification unit 1012 may acquire the position information from the GPS module 140.

The security management unit 1013 performs security monitoring processing. The security management unit 1013 detects that the vehicle has been unlocked not via a proper procedure, based on, for example, data received from an ECU 300 that controls the electronic lock of the vehicle, and transmits security notification to a predetermined apparatus. The security notification may include position information of the vehicle. In this case, the security management unit 1013 may acquire the position information from the GPS module 140. If the security management unit 1013 determines that a problem has occurred in security of the vehicle 10, the security management unit 1013 may acquire position information and periodically transmit the acquired position information to an external apparatus designated in advance.

The lock/unlock unit 1014 performs near-field wireless communication with the mobile terminal 20, and performs control to authenticate the mobile terminal 20, and based on a result of the authentication, performs control to lock and unlock (hereinafter, lock/unlock) a door of the vehicle 10. The lock/unlock unit 1014 is configured to be capable of communicating with the mobile terminal 20 located outside the vehicle, via the near-field communication module 150.

The lock/unlock unit 1014 performs authentication of the mobile terminal 20 based on an electronic key included in a request (hereinafter, "lock/unlock request") transmitted from the mobile terminal 20. More specifically, the lock/unlock unit 1014 compares authentication information stored in advance and the electronic key transmitted from the mobile terminal 20, and if the authentication information and the electronic key match, the lock/unlock unit 1014 determines that the authentication has successfully been done. If the authentication information and the electronic key do not match, the lock/unlock unit 1014 determines that the authentication has failed. If the authentication of the mobile terminal 20 has successfully been performed, the lock/unlock unit 1014 transmits an instruction for locking/unlocking (hereinafter, "lock/unlock instruction") to the ECU 300 that manages the electronic lock of the vehicle 10. Consequently, locking/unlocking of the vehicle using the mobile terminal 20 becomes possible.

Although the present example indicates the control of the electronic lock as an example, start-up of the vehicle 10 may be made possible based on a result of authentication of the mobile terminal 20.

The update unit 1015 performs update of software used by the DCM 100 or an electronic controller (ECU 300) included in the vehicle 10. For example, the update unit 1015 manages a version of firmware stored in each of the plurality of ECUs 300, and if new firmware is provided by an external apparatus, the update unit 1015 downloads the firmware via a network and performs processing for applying the firmware to a target apparatus.

Here, although as examples of functions provided by the DCM 100, the emergency notification function, the security function, the remote lock/unlock function and the software update function have been mentioned above, the DCM 100 may have functions other than these functions. For example, the DCM 100 may have, e.g., a function that performs driving diagnosis, a function that performs monitoring of a condition of a driver and a function that performs energy management.

The channel selection unit 1016 selects a communication channel to be used by the DCM 100.

Here, communication channels that can be used by the DCM 100 will be described. As illustrated in FIG. 1, the DCM 100 can communicate with an external network using a communication channel through the cellular communication network or using a communication channel through the local network.

Figure 5A:
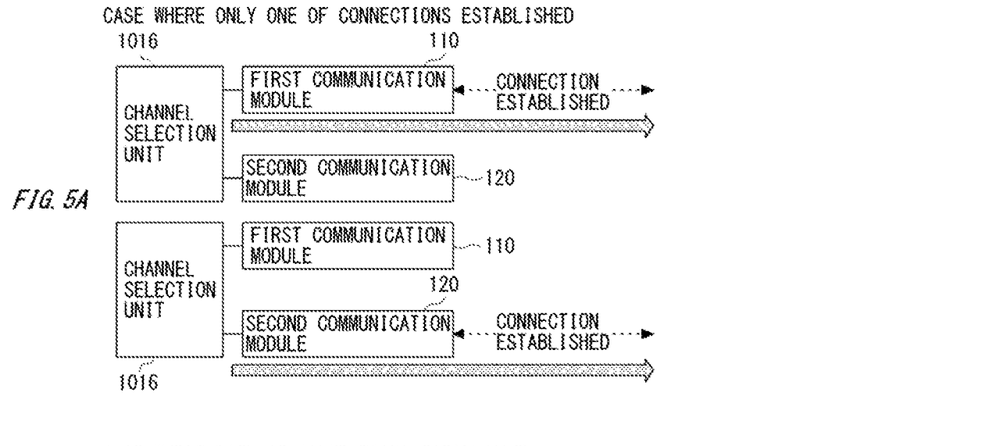
FIGS. 5A to 5C are diagrams each illustrating communication channel switching performed by a channel selection unit.
Figure 5B:
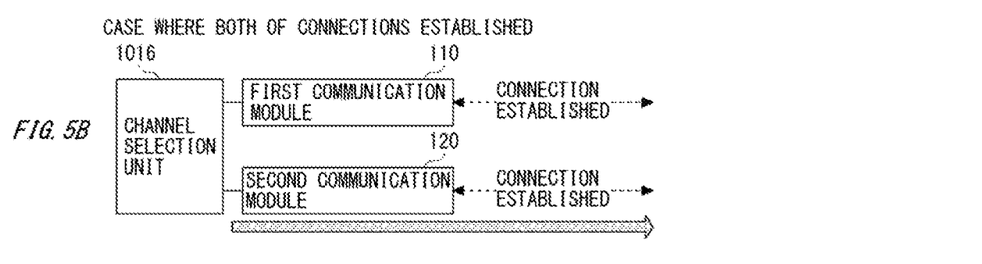
Figure 5C:
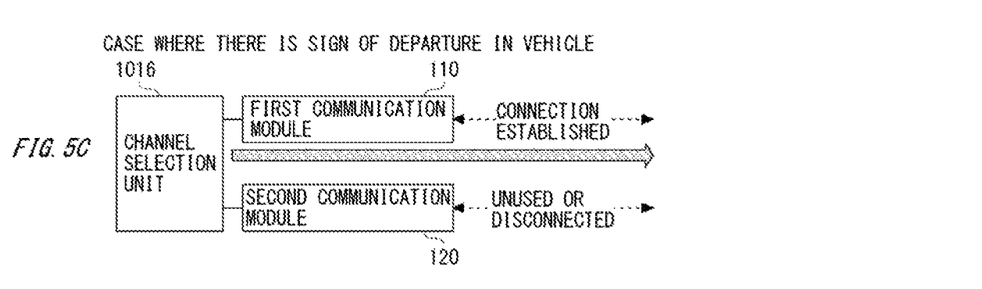

FIGS. 5A to 5C are schematic diagrams of processing for the channel selection unit 1016 to select a communication channel to be used. The channel selection unit 1016 determines which communication channel to use, based on respective statuses of connection to the cellular communication network and the local network. For example, as illustrated in FIG. 5A, if only one connection has been established, communication is performed via the channel for which connection has been established. For example, if only connection for the first communication module 110 has been established, the channel selection unit 1016 selects the cellular communication network as the communication channel to be used. Also, if only connection for the second communication module 120 has been established, the channel selection unit 1016 selects the local network as the communication channel to be used.

Also, as illustrated in FIG. 5B, if connection has been established for both of the channels, the channel selection unit 1016 performs communication with priority given to the local network. In other words, if both connection for the first communication module 110 and connection for the second communication module 120 have been established, the channel selection unit 1016 performs communication using the second communication module 120.

If the DCM 100 performs communication using the second communication module 120 and it is determined that there is a sign of departure in the vehicle 10, the channel selection unit 1016 stops the use of the second communication module 120 and starts use of the first communication module 110 (FIG. 5C). For example, the channel selection unit 1016 disconnects connection to the local network and switches the communication channel to the cellular communication network. Consequently, it is possible to prevent a communication failure caused by an attempt to maintain the connection to the local network despite a start of travelling.

A method for detecting a sign of departure will be described later.

Next, the in-vehicle apparatus 200 will be described.

The in-vehicle apparatus 200 is an apparatus that provides information to an occupant of the vehicle 10, and is also called "car navigation system", "infotainment system", or "head unit". The in-vehicle apparatus 200 is capable of providing navigation or entertainment to the occupant of the vehicle. Also, the in-vehicle apparatus 200 may have a function that downloads, e.g., traffic information, road map data, music or a moving image through communication with an external network outside the vehicle 10. Also, the in-vehicle apparatus 200 may be an apparatus that links up with, e.g., a smartphone.

The in-vehicle apparatus 200 can be configured as a computer including a processor such as a CPU or a GPU, a main memory including, e.g., a RAM or a ROM and an auxiliary memory such as an EPROM, a hard disk drive or a removable medium. In the auxiliary memory, e.g., an operating system (OS), various programs and various tables are stored, and functions meeting a predetermined purpose such as those described later can be implemented by executing a program stored in the auxiliary memory. However, some or all of the functions may be implemented by a hardware circuit such as an ASIC or an FPGA.

The in-vehicle apparatus 200 includes a controller 201, a storage unit 202, a communication unit 203 and an input/output unit 204.

The controller 201 is means for performing control of the in-vehicle apparatus 200. The controller 201 is configured by, for example, an information processing unit such as a CPU (central processing unit) or a GPU (graphics processing unit).

The controller 201 provides information to an occupant of the vehicle. Examples of the provided information include, e.g., traffic information, navigation information, music, video, radio broadcasting and digital TV broadcasting. The controller 201 outputs the information via the input/output unit 204.

The storage unit 202 is means for storing information and is configured by a storage medium such as a RAM, a magnetic disk or a flash memory. In the storage unit 202, e.g., various programs to be executed by the controller 201 and data to be used by the programs are stored.

The communication unit 203 is a communication interface that connects the in-vehicle apparatus 200 to the bus of the in-vehicle network.

The input/output unit 204 is means for receiving an input provided via a user's operation and presenting information to the user. More specifically, the input/output unit 204 includes a touch panel and control means for the touch panel and a liquid-crystal display and control means for the liquid-crystal display. In the present embodiment, the touch panel and the liquid-crystal display are included in a single touch panel display. Also, the input/output unit 204 may include, e.g., a speaker for outputting audio sound.

Figure 6:
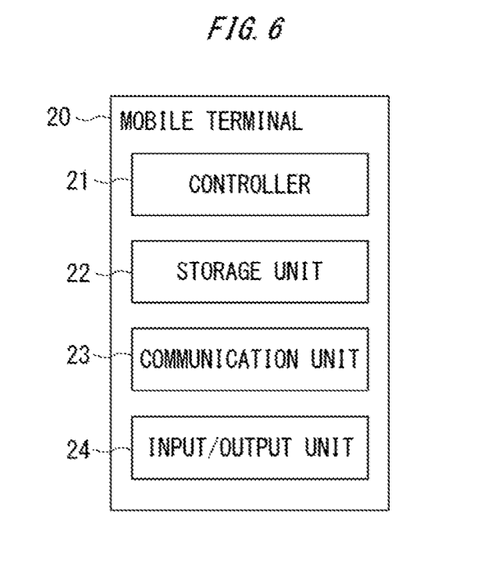
FIG. 6 is a diagram illustrating components included in a mobile terminal.

Next, the mobile terminal 20 will be described. FIG. 6 is a schematic diagram illustrating a configuration of the mobile terminal 20 in the present embodiment.

The mobile terminal 20 is a computer associated with the user. The mobile terminal 20 may be a terminal carried by an occupant of the vehicle. The occupant of the vehicle can lock/unlock the vehicle 10 through communication with the DCM 100 via the mobile terminal 20.

The mobile terminal 20 is a computer, such as, for example, a personal computer, a smartphone, a mobile phone, a tablet computer or a personal information terminal. The mobile terminal 20 includes a controller 21, a storage unit 22, a communication unit 23 and an input/output unit 24.

The controller 21 is means for performing control of the mobile terminal 20. The controller 21 performs, for example, processing for generating a lock/unlock request, processing for acquiring an electronic key for making the DCM 100 perform authentication and processing for transmitting the lock/unlock request and the electronic key to the DCM 100. The controller 21 is configured by, for example, a microcomputer. The controller 21 may implement these functions through execution of programs stored in storage means (e.g., a ROM), by a CPU.

The electronic key may be stored in the mobile terminal 20 (for example, the storage unit 22) or may be acquired from an external apparatus that issues key information. The electronic key issued by the external apparatus may have an expiration date or may be, e.g., a one-time key.

The storage unit 22 includes a main memory and an auxiliary memory. The main memory is a memory onto which a program to be executed by the controller 21 and data to be used by the program are loaded. The auxiliary memory is a device in which programs to be executed in the controller 21 and data to be used by the program are stored. In the auxiliary memory, programs to be executed by the controller 21, the programs being packaged as an application, may be stored. Also, an operating system for executing the application may be stored. The below-described processing is performed by a program stored in the auxiliary memory being loaded onto the main memory and being executed by the controller 21.

The main memory may include a RAM (random-access memory) or a ROM (read-only memory). Also, the auxiliary memory may include an EPROM (erasable programmable ROM) or a hard disk drive (HDD).

Furthermore, the auxiliary memory may include a removable recording medium.

The communication unit 23 is a module that performs near-field wireless communication with the DCM 100. In the present embodiment, the communication unit 23 can communicate with the DCM 100 using BLE.

The communication unit 23 may double as a communication interface for communicating with a wide area network. For example, the communication unit 23 may include a communication module for connecting to a cellular communication network and a communication module for connecting to a wireless LAN network.

The input/output unit 24 is a unit that receives an input provided via a user's operation and presents information to the user. The input/output unit 24 is configured by, for example, a single touch panel display. The input/output unit 24 may include a liquid-crystal display and control means for the liquid-crystal display and a touch panel and control means for the touch panel.

An ECU 300 is an electronic control unit that controls a component included in the vehicle 10. A plurality of ECUs 300 may be included in the vehicle 10. The plurality of ECUs 300 control, for example, components of different systems such as an engine system, an electric system and a powertrain system, respectively. Each ECU 300 has a function that generates a prescribed message and periodically transmits and receives such message via the in-vehicle network.

Also, each ECU 300 can provide a predetermined service through external communication via the DCM 100. Examples of the predetermined service include, e.g., a remote service (for example, a remote air-conditioning service), a security monitoring service, a service that links up with smart home and an autonomous parking service. Also, the examples also include a service for remote locking/unlocking, which has been mentioned above.

As with the DCM 100, each ECU 300 can be configured as a computer including a processor such as a CPU or a GPU, a main memory including, e.g., a RAM and a ROM and an auxiliary memory such as an EPROM, a disk drive and/or a removable medium.

The network bus 400 is a communication bus forming the in-vehicle network. In the present example, only a single bus is illustrated as an example; however, the vehicle 10 may include two or more communication buses. The plurality of communication buses may be interconnected by the DCM 100 or a gateway that assembles the plurality of communication buses.

Figure 7:
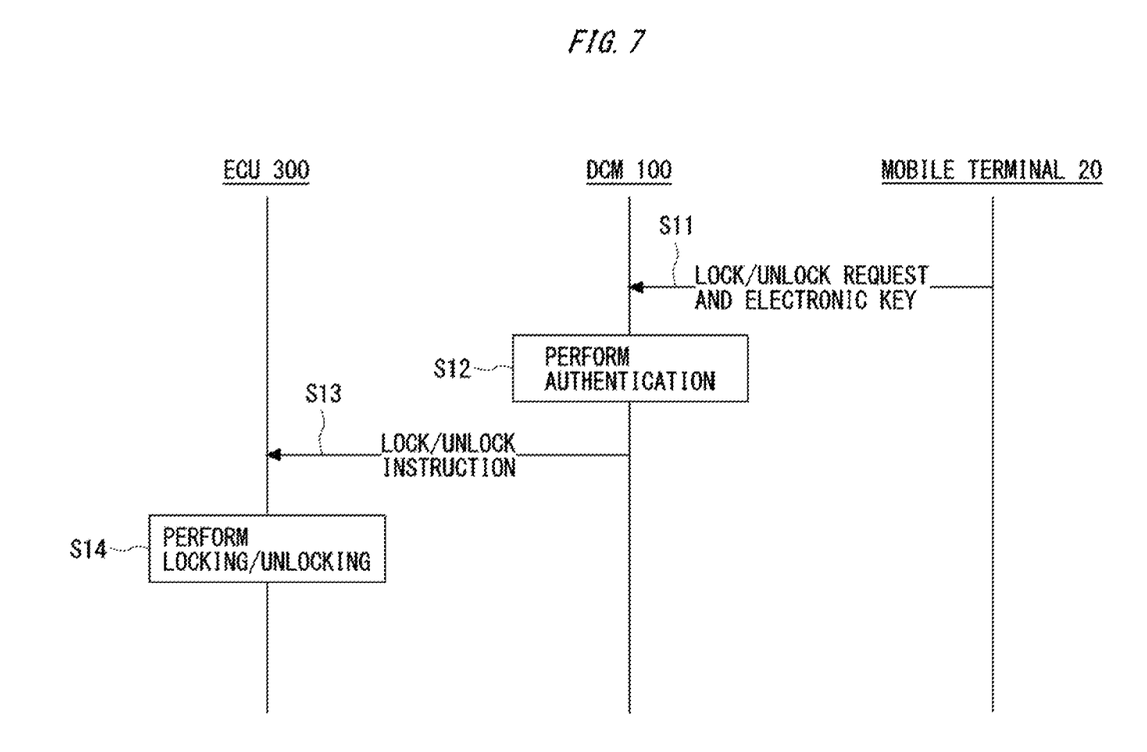
FIG. 7 is a flowchart of processing for locking/unlocking a vehicle.

Next, processing for the mobile terminal 20 to lock/unlock the vehicle 10 via the DCM 100 will be described. FIG. 7 is a flowchart illustrating an overview of the processing. The illustrated flow is started where an operation for locking/unlocking is performed via the mobile terminal 20.

Upon the user of the mobile terminal 20 (that is, an occupant of the vehicle 10) performing an operation to unlock the vehicle 10 via the input/output unit 24, a BLE link is established between the mobile terminal 20 and the DCM 100, and in step S11, the mobile terminal 20 transmits a lock/unlock request and an electronic key to the DCM 100.

In step S12, the lock/unlock unit 1014 included in the DCM 100 performs authentication processing by matching the electronic key transmitted from the mobile terminal 20 and the authentication information stored in advance. If the authentication is successfully performed, a lock/unlock instruction is transmitted to the ECU 300 that manages the electronic lock of the vehicle 10 (step S13), and upon reception of the instruction, the ECU 300 locks/unlocks the door (step S14). If the authentication fails, the processing in step S13 onward is not executed.

After completion of the locking/unlocking, the DCM 100 may transmit a notice of completion of the operation to the mobile terminal 20. Consequently, it is possible to output the notice of completion of the locking/unlocking onto the touch panel screen of the mobile terminal 20.

Next, processing for the channel selection unit 1016 to select a communication channel will be described.

As described above, the DCM 100 is configured to be capable of performing communication via the cellular communication network or the local network.

The channel selection unit 1016 stores data relating to a contract of cellular communication and data relating to the local network, and during activation of the vehicle system, performs control to automatically connect to the respective networks.

On the other hand, the vehicle 10 may need data communication even during being parked. Therefore, even where a driving system of the vehicle 10 halts, if a certain condition is met, the channel selection unit 1016 establishes connection via the local network.

More specifically, the channel selection unit 1016 executes (1) a phase of detecting that the vehicle 10 is parked and attempting connection to the local network and (2) a phase of detecting a sign of departure of the vehicle 10 and switching the communication channel to the cellular communication network. The former is referred to as "first phase" and the latter is referred to as "second phase".

Figure 8:
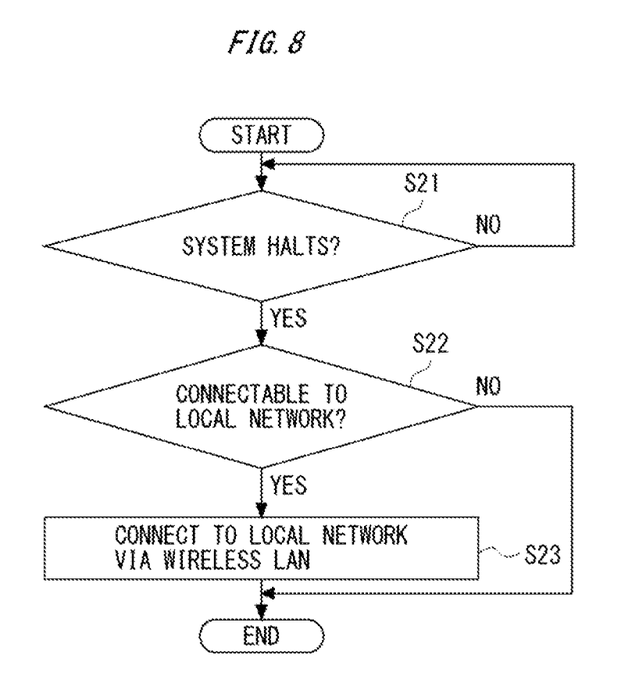
FIG. 8 is a flowchart of processing for connecting a DCM to a local network.

FIG. 8 is a flowchart of processing in the first phase. The illustrated processing is executed by the channel selection unit 1016 during activation of the driving system of the vehicle.

First, in step S21, whether or not the driving system of the vehicle halts is determined. In the present step, for example, information relating to a status of the driving system is acquired from an ECU 300 that controls driving of the vehicle. Where the driving system of the vehicle does not halt, the processing returns to an initial state. If the driving system of the vehicle halts, the processing transitions to step S22.

In step S22, whether or not connection to a predetermined local network is possible is determined. In the present step, an attempt to connect to a local network registered in advance (for example, a home network built at home), via the second communication module 120 is made. Here, if the connection fails, the processing ends. If the connection is possible, the processing transitions to step S23, and connection to the target local network is made via a wireless LAN.

In the present step, the configuration may be provided in such a manner as to make connection to the local network only where there is no sign of departure of the vehicle.

Upon connection to the local network being completed, the DCM 100 starts communication according to a predetermined procedure.

Figure 9:
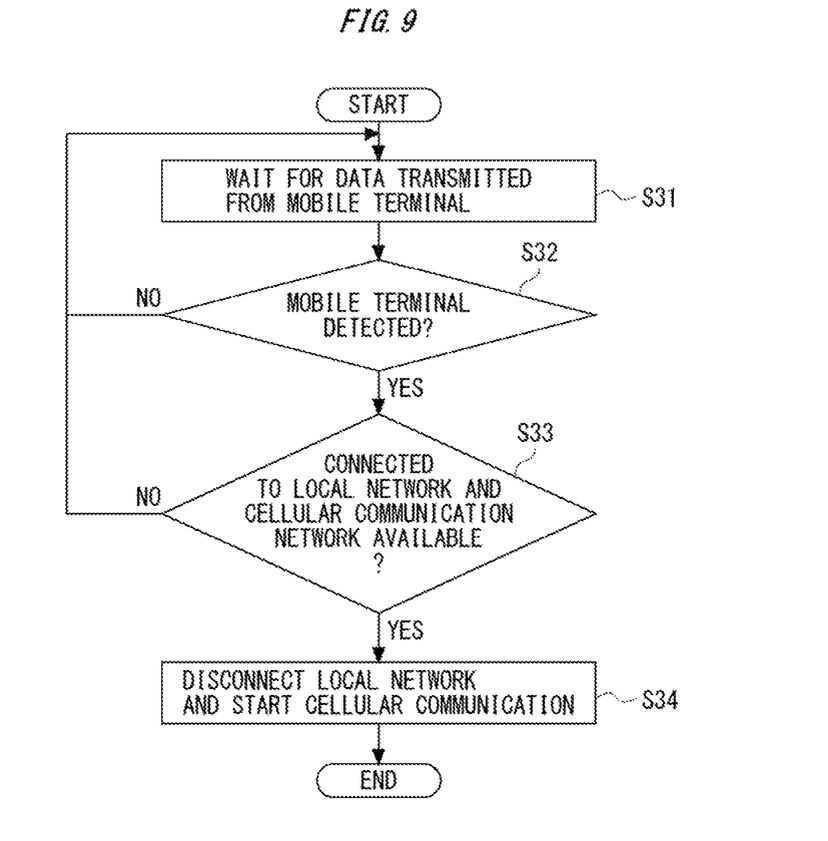
FIG. 9 is a flowchart of processing for switching a communication channel to a cellular communication network in the first embodiment.

FIG. 9 is a flowchart of processing in the second phase. The illustrated processing is executed by the channel selection unit 1016 during a halt of the driving system of the vehicle.

First, in step S31, the near-field communication module 150 is used to wait for data transmitted from the mobile terminal 20. For example, where the mobile terminal 20 is present in the vicinity of the vehicle 10, the DCM 100 receives an advertising packet transmitted by the mobile terminal 20. The advertising packet is a packet for an apparatus using BLE to provide notification of device information of the DCM 100 to an area around the DCM 100.

In step S32, whether or not the mobile terminal 20 registered in advance is newly detected in the vicinity of the vehicle 10 or inside the cabin of the vehicle is determined. The DCM 100 stores the device information included in the advertising packet, in advance, and if the device information included in the received packet coincides with the stored device information, the DCM 100 can determine that the mobile terminal 20 registered in advance has been detected. The mobile terminal registered in advance can be, for example, a mobile terminal carried by the driver of the vehicle.

The mobile terminal 20 registered in advance being newly detected means that the occupant carrying the mobile terminal 20 is coming close to the vehicle 10 (or has got in the vehicle 10). In the present embodiment, in such case, it is determined that there is a sign of departure of the vehicle.

If an affirmative determination is made in the present step, the processing transitions to step S33. In a case other than the above case, the processing returns to the initial state.

Note that "the mobile terminal 20 being newly detected" means that the mobile terminal 20 has been detected for the first time in a predetermined period of time. The configuration may be provided in such a manner to, if the mobile terminal 20 has continuously been detected, determine that the vehicle 10 has already been travelling and prevent the illustrated processing from being performed.

In step S33, whether or not the DCM 100 is currently connected to the local network and the cellular communication network is available is determined. If connection to the cellular communication network is disconnected, in the present step, an attempt to attach to the cellular communication network may be made. As a result, if it is determined that the cellular communication network is available, the processing transitions to step S34. If the cellular communication network is not available, the processing returns to the initial state.

In step S34, the communication channel is switched from the local network to the cellular communication network. More specifically, an instruction for disconnection from the local network is provided to the second communication module 120 and the communication channel is switched to the cellular communication network (that is, the channel using the first communication module 110). Consequently, communication using the cellular communication network is started.

If the vehicle does not depart even after a lapse of a predetermined period of time from the execution of step S34, the communication channel may be switched to the local network, again.

As described above, in the communication system according to the first embodiment, if the mobile terminal 20 is detected in the vicinity of the vehicle, it is determined that there is a sign of departure of the vehicle, and the communication channel is switched to the cellular communication network. Consequently, it is possible to continue communication after departure of the vehicle.

Although the present embodiment indicates a form in which the vehicle 10 is locked/unlocked using the mobile terminal 20 as an example, but instead of the mobile terminal 20, a key fob may be used. A key fob is a mobile device for locking/unlocking the vehicle. A key fob is also called, for example, a smart key. In this case, the DCM 100 may detect presence of the key fob via a communication unit included in the vehicle 10, instead of the near-field communication module 150. It is also possible that at least one of the mobile terminal 20 and the key fob is a detection target.

Second Embodiment

In the first embodiment, switching of communication channels is made based on a result of detection of the mobile terminal 20. However, there are cases where whether a mobile terminal 20 is present or not alone may be difficult to determine whether or not an occupant intends to get in a vehicle. In order to respond to these cases, in the second embodiment, determination relating to a sign of departure of a vehicle is made in combination with other elements.

Figure 10:
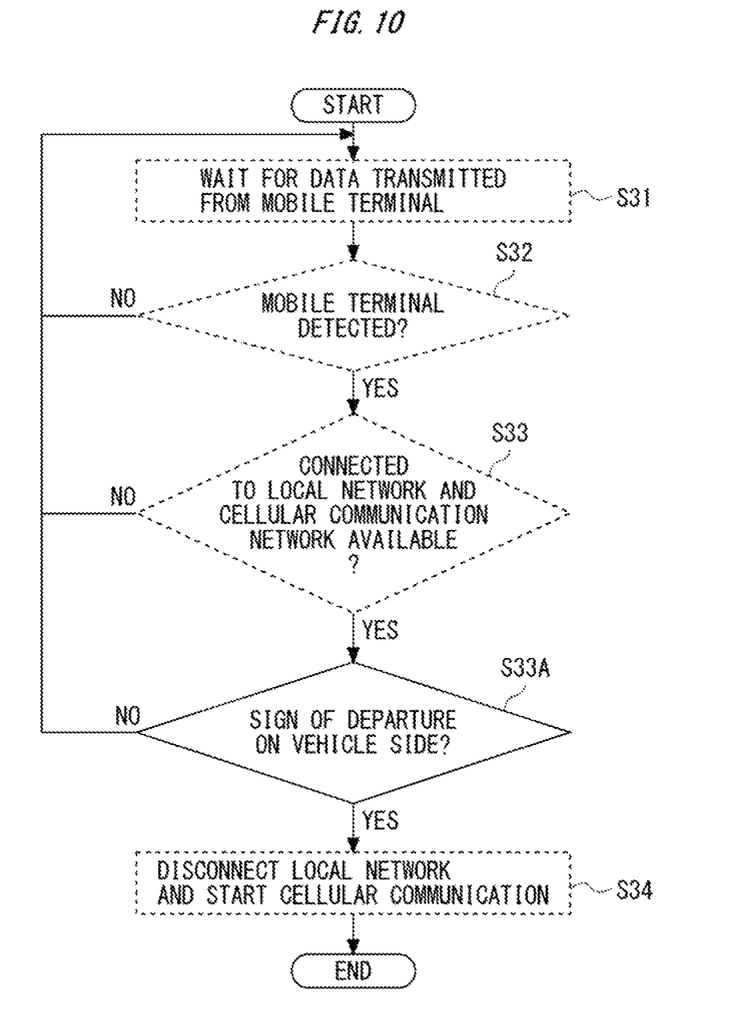
FIG. 10 is a flowchart of processing for switching a communication channel to a cellular communication network in a second embodiment.

FIG. 10 is a flowchart of processing performed by a DCM 100 in the second embodiment. In the present embodiment, after execution of step S33, whether or not a sign of departure appears on the vehicle side is determined (step S33A). For example, if any of the below conditions is met, it can be regarded that there is a sign of departure.

(1) A driving system of the vehicle is activated (or power is turned on);
(2) An engine of the vehicle is started;
(3) A door of the vehicle is unlocked; and
(4) It is detected that a driver is seated.

Such information can be acquired from an ECU 300 that controls a driving component of the vehicle 10 or a body component of the vehicle 10.

If an affirmative determination is made in step S33A, the processing transitions to step S34 and cellular communication is started through processing that is similar to that of the first embodiment. If a negative determination is made in step S33A, the processing returns to an initial state.

As described above, the second embodiment enables more accurate detection of a sign of departure of a vehicle.

A start of actual travel of the vehicle 10 may be added to the conditions for determination in step S33A. For example, the configuration may be made in such a manner to determine a start of actual travel of the vehicle 10 based on speed information acquired by a vehicle speed sensor and position information acquired by a GPS module and make switching of communication channels at a timing of the start of travel of the vehicle.

(Alternations)

The above-described embodiments are definitely mere examples and the present disclosure can be carried out with appropriate changes made to the above-described embodiments without departing from the spirit of the disclosure.

For example, any of the processing and any of the means described in the present disclosure can freely be combined as long as such combination causes no technical contraction.

Also, in the description of the embodiments, determination relating to a sign of departure of the vehicle 10 is made based on a result of detection the mobile terminal 20; however, the determination may be made based on an element other than such result. For example, departure of the vehicle 10 may be determined based on a result of determination in step S33A alone with execution of steps S31 and S32 omitted.

Also, in the description of the embodiments, if a sign of departure of the vehicle is detected, connection to the local network is disconnected; however, connection to the local network does not necessarily need to be disconnected as long as no period of time in which communication is impossible occurs. For example, both a communication channel through the first communication module 110 and a communication channel through the second communication module 120 may be set up to enable communication using both communication channels.

Also, in the description of the embodiments, an electronic key is transmitted via near-field wireless communication; however, the mobile terminal 20 and the DCM 100 do not necessarily need to be connected via near-field wireless communication. For example, the configuration may be made in such a manner that the mobile terminal 20 and the DCM 100 exchange key information via a local network and/or a wide area network (e.g., the Internet).

Also, in the description of the embodiments, the DCM 100 mounted on the vehicle 10 makes switching of communication channels; however, the configuration may be made in such a manner that an apparatus connected to an external network provides an instruction to switch communication channels to the DCM 100.

Also, processing described as processing to be performed by a single apparatus may be shared and executed by a plurality of apparatuses. On the other hand, processes described as processes performed by different apparatuses may be executed by a single apparatus. In the computer system, what hardware configuration (server configuration) to be employed to implement each function can flexibly be changed.

The present disclosure can be implemented also by supplying a computer program with functions implemented therein, the functions being described in the above embodiments, to a computer and one or more processors included in the computer reading and executing the program. Such computer program may be provided to a computer via a non-transitory computer-readable storage medium that is connectable to a system bus of the computer or may be provided to a computer via a network. Examples of the non-transitory computer-readable storage medium include any types of disks including, e.g., magnetic disks (e.g., floppy (registered trademark) disks and hard disk drives (HDDs)) and optical disks (e.g., CD-ROMs, DVD disks and Blu-ray disks), read-only memories (ROM), random-access memories (RAMs), EPROMs, EEPROMs, magnetic cards, flash memories, optical cards, and any types of mediums suitable for storing an electronic instruction.

What is claimed is:

1. A wireless communication apparatus mounted on a vehicle, the wireless communication apparatus comprising:
   a first antenna configured to use a first communication network that is a cellular communication network;

a second antenna configured to use a second communication network that is a communication network other than the cellular communication network; and a controller configured to determine which of the first communication network and the second communication network is to be used to perform communication, based on a sign of departure of the vehicle, wherein when it is determined that there is the sign of departure of the vehicle and the vehicle is connected to the second communication network, the controller switches the network used for communication from the second communication network to the first communication network.

2. The wireless communication apparatus according to claim 1, wherein when it is determined that there is the sign of departure of the vehicle and the vehicle is connected to the second communication network, the controller cancels the connection to the second communication network.

3. The wireless communication apparatus according to claim 1, wherein when there is no sign of departure of the vehicle and both of the first communication network and the second communication network are available, the controller performs communication using the second communication network.

4. The wireless communication apparatus according to claim 1, wherein the second communication network is a wireless communication network incapable of performing a handover.

5. The wireless communication apparatus according to claim 1, wherein when a user terminal is newly detected in a vicinity of the vehicle or inside a cabin of the vehicle, the controller determines that there is the sign of departure of the vehicle.

6. The wireless communication apparatus according to claim 5, wherein the user terminal is a mobile terminal carried by an occupant of the vehicle or a key fob of the vehicle.

7. The wireless communication apparatus according to claim 1, wherein when a driving system of the vehicle is activated, the controller determines that there is the sign of departure of the vehicle.

8. An information processing apparatus for performing communication control of a vehicle capable of using a first communication network that is a cellular communication network and a second communication network that is a communication network other than the cellular communication network, the information processing apparatus comprising a controller configured to determines which of the first communication network and the second communication network is to be used for the vehicle to perform communication, based on a sign of departure of the vehicle, wherein when it is determined that there is the sign of departure of the vehicle and the vehicle is connected to the second communication network, the controller switches the network used for communication from the second communication network to the first communication network.

9. The information processing apparatus according to claim 8, wherein when it is determined that there is the sign of departure of the vehicle and the vehicle is connected to the second communication network, the controller cancels the connection to the second communication network.

10. The information processing apparatus according to claim 8, wherein when there is no sign of departure of the vehicle and both of the first communication network and the second communication network are available, the controller performs communication using the second communication network.

11. The information processing apparatus according to claim 8, wherein the second communication network is a wireless communication network incapable of performing a handover.

12. The information processing apparatus according to claim 8, wherein when a user terminal is newly detected in a vicinity of the vehicle or inside a cabin of the vehicle, the controller determines that there is the sign of departure of the vehicle.

13. The information processing apparatus according to claim 12, wherein the user terminal is a mobile terminal carried by an occupant of the vehicle or a key fob of the vehicle.

14. The information processing apparatus according to claim 8, wherein when a driving system of the vehicle is activated, the controller determines that there is the sign of departure of the vehicle.

15. An information processing method execute by an information processing apparatus, the information processing method comprising:

detecting a sign of departure of a vehicle capable of using a first communication network that is a cellular communication network and a second communication network that is a communication network other than the cellular communication network; and determining which of the first communication network and the second communication network is to be used for the vehicle to perform communication, based on the sign of departure of the vehicle, wherein, in the determining, when it is determined that there is the sign of departure of the vehicle and the vehicle is connected to the second communication network, the information processing apparatus switches the network used for communication from the second communication network to the first communication network.

16. The information processing method according to claim 15, wherein in the detecting, when a user terminal is newly detected in a vicinity of the vehicle or inside a cabin of the vehicle, the information processing apparatus determines that there is the sign of departure of the vehicle.

* * * * *